Patented June 6, 1933

1,912,878

UNITED STATES PATENT OFFICE

BODO ZSCHIMMER, OF LUDWIGSHAFEN-ON-THE-RHINE, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

PRODUCTION OF COLOR LAKES

No Drawing. Original application filed November 1, 1928, Serial No. 316,625, and in Germany November 14, 1927. Divided and this application filed May 11, 1931. Serial No. 536,657.

The present invention relates to the production of complex compounds containing tungsten or molybdenum or both and color lakes obtained therewith.

It is already known that valuable complex compounds can be produced from compounds of tungsten or molybdenum, or both, by treating the latter with compounds of phosphorus, silicon, boron, aluminium, chromium, iron, manganese, arsenic, antimony and the like.

I have now found that other valuable complex compounds containing tungsten or molybdenum, or both, can be produced by mixing together the dissolved substances requisite for the production of the said valuable complex compounds, and bringing reducing agents into action simultaneously or subsequently, or by employing the components containing the tungsten or molybdenum compounds in a low stage of oxidation, as for example by treating tungstates or molybdates with reducing agents, and then subjecting them to the action of the other necessary components. For example, reducing agents, such as a solution of a bisulphite, hydrosulphite, dextrose and the like may be allowed to act on mixtures of sodium tungstate and sodium molybdate or of sodium silicate or borate and sodium molybdate, and, under these conditions, generally deep violet blue solutions, containing the new complex compounds, are produced. It is advantageous to carry out the operation in the presence of inorganic or organic acids, and it is also sometimes suitable to work under pressure. The complex compounds may be recovered in the dry state by salting out their solutions, or by passing gaseous hydrochloric acid therethrough, or by evaporating their solutions.

Again, phosphotungstic acid, or salts of the same, may be treated with molybdenum salts and phosphates, the resulting product being then reduced. The tungsten or molybdenum compounds may also be reduced in the first instance and the resulting products may be subjected to the action of compounds capable of producing complex compounds containing tungsten or molybdenum.

The new complex compounds produced as herein described can, if desired, be employed directly, in the form of the solution obtained in their production, for converting basic dye-stuffs, even those containing acid groups, or mono- or poly-nuclear aromatic compounds containing one or more primary, secondary or tertiary amino groups devoid of any affinity to vegetable and animal fibres and free from acid groups, into valuable color lakes or pigments. The production of these complex compounds, containing molybdenum or tungsten or both, may also be combined with the preparation of the color lakes or pigments, as for example by adding the basic dyestuff, at the time of mixing the components, required for the formation of the complex compounds, together with the reducing agent.

The preparation of the aforesaid color lakes is preferably carried out in solution, most suitably in aqueous solution. The operation may be performed under ordinary pressure, but it is often advantageous to subject the color lakes to pressure at an elevated temperature, which, however, should not be so high that the color lakes are decomposed or destroyed during or after their production.

The color lakes may also be produced in the presence of the substrata usually employed in the color lake industry, such as for instance heavy spar, hydrated aluminium oxide, or a mixture of the latter with blanc fixe and the like, and the process may be carried out with the addition of dispersive agents, such as salts of alkylated naphthalene sulphonic acids, sodium cholate, Turkey red oils and the like.

The following examples will further illustrate the nature of the said invention which, however, is not limited thereto. The parts are by weight where not otherwise specified.

Example 1

80 parts of sodium tungstate dissolved in water (1:5) are mixed with the aqueous solutions (1:10) of 15 parts of disodium phosphate and 40 parts of sodium molybdate, 80 parts by volume of hydrochloric acid (20° Baumé) being added. 5 parts of powdered hydrosulphite are introduced, and the charge, after standing for a time, is slowly heated to boiling. Boiling is continued until the smell of sulphuretted hydrogen has disappeared, the mixture being then cooled and made up to 1000 parts by volume.

The hydrosulphite may be replaced by 20 parts of 38° Baumé sodium bisulphite solution.

The complex compound can be easily precipitated, in the solid form, for example by passing gaseous hydrochloric acid through the solution obtained according to the example.

The solution obtained in this manner, or the complex phosphotungstomolybdenum compound isolated therefrom is used for precipitating basic dyestuffs, and furnishes color lakes which are substantially faster to light than those obtained by using the corresponding phosphotungstomolybdenum compounds prepared without the employment of reducing agents.

Example 2

An aqueous solution (1:20) of 18 parts of calcined soda is added at about 70° C. to an aqueous solution (1:20) of 37 parts of aluminium sulphate and the precipitated hydrated aluminium oxide washed as usual. 6 parts of Diamond green G (Color Index 1924 No. 662) dissolved in 600 parts of water are added to the hydrated aluminium oxide substratum and precipitated by the addition of 100 parts by volume of the solution of the reduced complex salt obtained according to Example 1.

The color lake thus obtained when worked up to a wall paper dye furnishes bright green shades of a high fastness to light.

Example 3

6 parts of Rhodamine B extra (Color Index 1924 No. 749) dissolved in 600 parts of water are added to a substratum prepared as described in the foregoing example and precipitated by the addition of 110 parts by volume of the solution of the reduced complex salt obtained according to Example 1.

The color lake thus obtained furnishes when worked up to a printing paste for graphic purposes or to a wall paper dye bright blue-red shades highly fast to light.

The fastness to light of the color lake may remarkably be increased by boiling the solution containing the precipitated color lake.

Example 4

12 parts of p-aminobenzaldehyde are dissolved in 2000 parts of hot water after the addition of 25 parts of hydrochloric acid of 20° Baumé. The said solution is stirred into 600 parts by volume of the solution of the reduced complex salt obtained according to Example 1. An orange pigment of very good fastness to light is obtained.

This application has been divided out from my copending application Ser. No. 316,625, filed November 1, 1928.

What I claim is:

1. A process of producing color lakes and pigments, which comprises treating an organic compound selected from the group consisting of basic dyestuffs which may also contain acid groups, and aromatic amines devoid of any affinity to natural fibres and free from acid groups, with a complex compound obtainable by acting on a soluble compound of at least one metal selected from the group consisting of tungsten and molybdenum, with a reducing agent and an acid derived from an element selected from the group consisting of iron, phosphorus, silicon, manganese, boron, arsenic and antimony or a salt of such an acid.

2. A process of producing color lakes, which comprises treating a basic dyestuff with a complex compound obtainable by acting on a soluble compound of at least one metal selected from the group consisting of tungsten and molybdenum with a reducing agent and an acid derived from an element selected from the group consisting of iron, phosphorus, silicon, manganese, boron, arsenic and antimony or a salt of such an acid.

3. A process of producing color lakes, which comprises treating a basic dyestuff with a complex compound obtainable by acting on an acid solution containing a molybdate and an acid derived from an element selected from the group consisting of iron, phosphorus, silicon, manganese, boron, arsenic and antimony or a salt of such an acid with a reducing agent.

4. A process of producing color lakes, which comprises treating a basic dyestuff with a complex compound obtainable by acting on an acid solution containing a molybdate and a phosphate with a reducing agent.

5. As new articles of manufacture pigments containing in complex combination a compound of at least one of the metals tungsten and molybdenum in a low stage of oxidation, which pigments are obtainable by treating an aromatic amine, devoid of any affinity to natural fibres and free from acid groups, with a complex compound which contains at least one of the said metals and which is obtainable by acting on a soluble compound of at least one of the said metals with a reducing agent and an acid derived from an element selected from the group consisting of iron, phosphorus, silicon, manganese, boron, arsenic and antimony or a salt of such an acid.

6. A process of producing color lakes which comprises treating a basic dyestuff with a complex compound obtainable by acting on an acid solution containing sodium molybdate and a sodium phosphate with a reducing agent.

7. A process of producing color lakes which comprises treating a basic dyestuff with a complex compound obtainable by acting on an acid solution containing sodium molybdate and disodium phosphate with a reducing agent.

8. A process of producing color lakes which comprises treating a basis dyestuff with a complex compound obtainable by acting on an acid solution containing sodium tungstate, sodium molybdate and disodium phosphate with sodium hydrosulfite.

In testimony whereof I affix my signature.

BODO ZSCHIMMER.